Oct. 28, 1958     J. R. FROST     2,858,186
PROCESS FOR PREPARATION OF FILAMENTARY
ARTICLES FROM POLYMER LATEXES
Filed Oct. 5, 1956
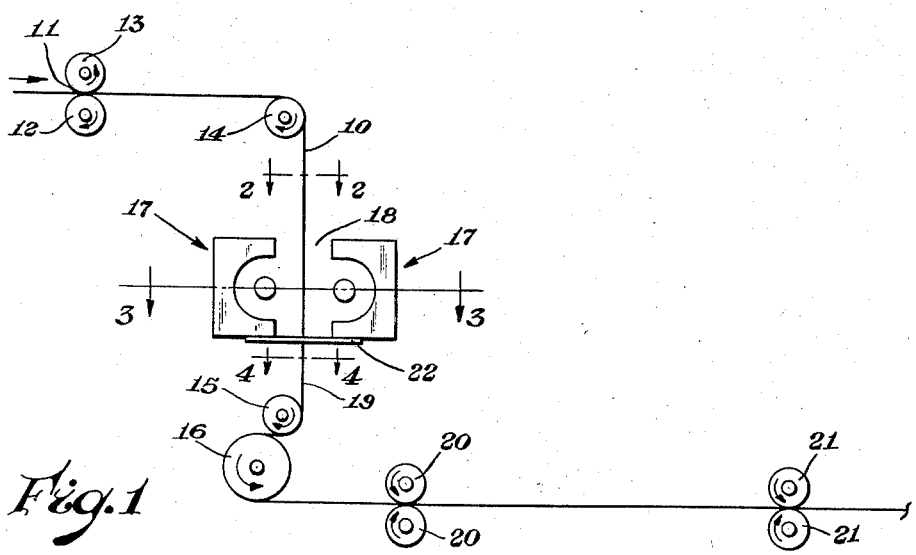
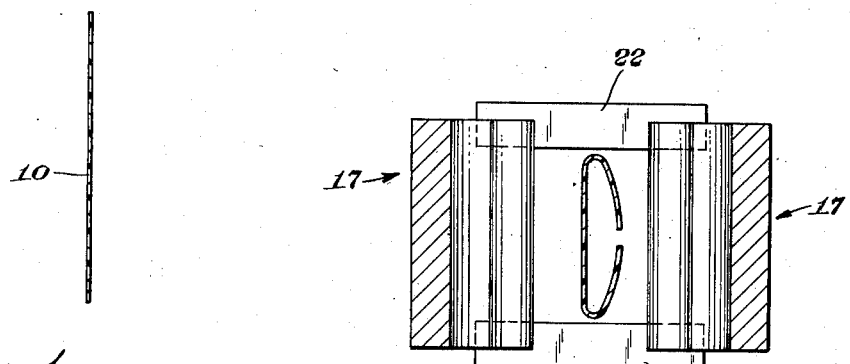
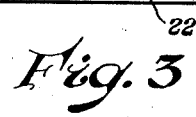
INVENTOR.
John R. Frost
BY
Griswold & Burdick
ATTORNEYS

United States Patent Office 2,858,186
Patented Oct. 28, 1958

2,858,186

PROCESS FOR PREPARATION OF FILAMENTARY ARTICLES FROM POLYMER LATEXES

John R. Frost, Midland, Mich., assignor to The Dow Chemical Company, Midland, Mich., a corporation of Delaware Application October 5, 1956, Serial No. 614,169

5 Claims. (Cl. 18—54)

This invention relates to a process for preparing filamentary articles from polymer latexes. More particularly it relates to such a process for preparing those articles from coagula formed by the localized coagulation of polymer latexes. For purposes of this application the term, localized coagulation, means the controlled coagulation of a polymer latex at the site at which the coagulum is formed in the approximately desired shape as contrasted to the coagulation of a large volume of latex with subsequent shaping.

When a polymer latex is used for preparing any continuous coherent articles the initial solid products whether formed by localized coagulation or by simple deposition and drying of the latex are very weak. In that state films and tapes are less fragile than fibrous forms and are easier to handle in fusion, and other processing operations prior to fusion. The conversion of tapes prepared from polymer latexes into filamentary articles is known. The common method for making such articles by that conversion is to prepare a continuous coherent fused film, slit that film into tapes, and to convert the tapes into the filamentary articles by drawing the tapes on a bias over a heated roll causing the tapes to twist or roll up into a filamentary form. The conversion to the filamentary article may be achieved with simultaneous stretching to draw down and to orient the article. However, that procedure still requires that all of the usual film forming steps of shaping, drying, and fusion be accomplished before conversion to the filamentary articles. Additionally that procedure requires that careful control be maintained on the tension on the film, the temperature of the heated roll, and the direction and speed of travel of the tape over the roll. It would be desirable to have a process for converting polymer latexes into filamentary articles using tapes as an intermediate form but which did not require fusion of the tapes prior to conversion and which required less careful control of the procedural steps.

It is accordingly the principal object of this invention to provide an improved process for preparing filamentary articles from polymer latexes.

It is a further object to provide such a process using tapes as an intermediate form.

It is a still further object to provide such a process for preparing filamentary articles having improved strength over similar products prepared by prior processes.

The above and related objects are accomplished by the process comprising as essential sequential steps the localized coagulation of a film forming polymer latex of a normally crystalline polymer into a continuous porous coagulum, washing said coagulum free of coagulant, drying said coagulum below its sintering temperature, exposing said coagulum under no applied tension to a heated zone above the sintering temperature but below the decomposition temperature of said coagulum, for a time sufficient to achieve complete sintering, and finally orienting the fused filamentary article.

The latexes which are useful in the process of this invention are those film forming, electrolyte-coagulable polymer latexes of any crystalline polymer capable of forming a continuous coherent film, of being obtained in a supercooled amorphous state, and of being oriented. The normally crystalline vinylidene chloride polymers form particularly useful films, develop considerable crystallinity in a relatively short time, lend themselves well to the process, and are accordingly preferred.

To obtain useful continuous coherent articles it is desirable to have the latex contain from about 30 to about 50 percent by weight of non-volatile solids. Latexes containing less than about 30 percent solids are uneconomical to prepare, and continuous, coherent articles are difficult to prepare by simple deposition of such latexes. Latexes containing more than about 50 percent solids are difficult to prepare and are extremely sensitive to storage and to mechanical shear and may coagulate prematurely.

It is known that the preparation of continuous coherent articles by simple deposition from polymer latexes is most easily and satisfactorily accomplished when the majority of the individual particles of the latex have diameters in the range of from about 700 to 2000 Angstrom units. Latexes having particle sizes outside of the stated range are useful in the process, but they do not have as good stability or capability of deposition into the desired coagulum.

The process of the invention is illustrated schematically in the annexed drawings which exemplify a preferred embodiment. It should be understood that the process is not limited in mechanical details or arrangement of the parts of the necessary apparatus other than the relative positions illustrated.

In the drawings:

Fig. 1 represents a schematic elevation of a preferred arrangement of apparatus for carrying out the process;

Fig. 2 is a magnified cross-section of the coagulum along line 2—2 of Fig. 1;

Fig. 3 is a magnified cross-section along line 3—3 of Fig. 1; and

Fig. 4 is a magnified cross-section of the filamentary article along line 4—4 of Fig. 1.

The continuous coagula finding use in this invention are easily prepared by known methods and are not illustrated. Typically a polymer latex is subjected to localized coagulation with an electrolyte coagulant, washed, and then dried at a temperature below the sintering or fusion temperature. The localized coagulation step is most conveniently accomplished by wetting a continuous solid surface with an aqueous coagulant and bringing a metered quantity of polymer latex into contact with that wetted surface. A useful solid surface for coagulating the latex is a continuous belt in contact with a transfer roll which also dips into a bath of coagulant. The latex may likewise be applied in metered amount to the surface by transfer roll or other known means. Following the localized coagulation of the latex the wet coagulum is washed with water to remove substantially all of the electrolyte coagulant. If such coagulants are left in the coagulum the heat stability of any articles prepared from that coagulum is seriously reduced. After washing the coagulum is dried under conditions that the porous, unsintered state of the coagulum is not altered. That drying is conveniently achieved by evaporation, slow drying at a relatively low temperature, or preferably by first removing the excess water by directing a planiform stream of air tangentially to the coagulum and then drying at a temperature below the sintering temperature. The dried coagulum, although weak, is self-supporting and capable of withstanding the subsequent procedural steps of this process.

The continuous coagulum 10 as prepared above is passed between the nip 11 of a pair of feed rolls (12, 13), The feed rolls (12, 13) deliver coagulum 10 to the subsequent steps of the process at a constant rate so that the time during which any portion of the coagulum 10 is exposed to heating conditions will be the same as for any other portion. Unless the exposure time is the same the cross section of the resulting filamentary article will be uneven along its length and the physical properties of the article will be correspondingly non-uniform. The coagulum 10 next passes over a first guide roll 14 thence around a second guide roll 15 and through the nip formed between roll 15 and a backing roll 16 in snubbing relation to roll 15. The film between rolls 14 and 15 is unsupported and hanging freely in relaxed condition by having rolls (15, 16) operating at a slower peripheral speed than feed rolls (12, 13). Between rolls 14 and 15 and disposed on either side of the unsupported coagulum 10 are radiant heating means 17 which may be strip heaters, infra-red lamps, quartz heaters and reflectors, or any other means capable of heating by radiation, to form a radiant heating zone 18. The distance at which the heaters 17 will be located from the coagulum 10 will be dictated by the amount of heat required to sinter or to fuse the coagulum into a continuous film. The thermal output of the heaters 17, the chemical characteristics, such as decomposition temperature, of the polymer forming the coagulum 10, the color of any pigment in the coagulum 10, the thickness of the coagulum 10, and the speed at which coagulum 10 is being fed into heating zone 18 are all interdependent factors that will influence the amount of heat required. Whether more or less heat is required is easily determined by observation of the sintered article 19 leaving the heating zone.

The sintered article 19 is conveniently supercooled by having roll 16 chilled. An alternative method for supercooling is to have roll 16 immersed in a water bath. Following supercooling the article is passed between the nips of two pairs of snubbing rolls (20, 20; 21, 21) to stretch the article 19 and thereby to induce orientation. The stretch is imparted by operating rolls 21 at a higher peripheral speed than rolls 20.

It has been found that updrafts are frequently encountered in the areas of the heating zone 18 near the edges of the coagulum 10. Those updrafts can cause non-uniform heating across the coagulum 10 unless very wide heaters 17 are employed. To minimize such effects shields 22 may be affixed to the lower surface of both heaters 17 and extend into the heating zone 18 to within ⅛ to ¼ inch of the sintered article 19. The shields 22 may be made of any suitable sheet material such as galvanized iron, tinplate, and the like.

As can be seen from Figures 2, 3, and 4, the filamentary article is formed by the controlled uniform curling of the coagulum upon itself accompanied by simultaneous sintering of the coagulum into a solid, non-porous article. If any tension is applied to the article by rolls 15, 16 the tendency to curl is counteracted and the coagulum passes through heating zone 18 as a flat tape or film.

The cross-sectional shape and dimensions of the filamentary article are determined by the physical and chemical properties of the polymer used, by the dimensional characteristics of the coagulum fed into the heating zone, and to a lesser extent by the amount of heat applied to the coagulum. When round filaments are desired it is desirable to leave a gap between rolls 15, 16 and to use rolls 20, 20 as take-up rolls. In such a way the articles are supercooled before snubbing and they are not flattened by that snubbing. It has been found that most desirable results are obtained when the coagulum is less than 1 inch in width. It should be apparent that the width of the coagulum and its density should be as constant as possible if articles of uniform shape and size are to be prepared.

Filamentary articles prepared by this process have superior tensile strengths elongations, and dimensional uniformity to those prepared by the prior procedures using latexes. Because the process has fewer procedural steps than prior procedures, it is more economical. Additionally the formative steps of this process do not depend upon a delicate balance between peripheral speeds of snubbing rolls or of other parts of the apparatus.

By way of example, a continuous coherent coagulum 0.002 inch in thickness and 0.34 inch in width was prepared by metering a quantity of a polymer latex containing 33 percent by weight of solids and prepared from 97 percent by weight of vinylidene chloride and 3 percent by weight of acrylonitrile onto a ceramic roll wetted with a 20 percent aqueous calcium chloride solution. The coagulum was stripped continuously from the roll, and washed with water to remove substantially all of the calcium chloride. The coagulum was then fed at a uniform rate of 20 feet per minute through a zone heated by two 100 watt per inch radiant heaters placed 0.75 inch from either side of the coagulum. The filamentary article was then passed around a chilled roll and finally between two pairs of snubbing rolls operated at peripheral speeds so as to impart a 4–1 stretch to the article. When tested the article was found to have a tensile strength of 2½ grams per denier and to be 400 denier. The elongation was found to be 12 percent.

When the coagulum was dried and sintered under tension so that it formed a flat tape, the tensile strength was only about 1 gram per denier.

Filamentary articles ranging from 175 to 900 denier have been produced in accordance with this process with correspondingly good physical properties.

I claim:

1. A process for preparing continuous filamentary articles from polymer latexes consisting of forming a continuous coherent strip of coagulum by continuously contacting a solid surface wetted with a coagulant with a film forming latex of a normally crystalline polymer, washing said strip to remove substantially all of the coagulant, drying said strip of coagulum under conditions that the porous structure is not significantly altered, forwarding said strip without applied tension through a radiantly heated zone maintained at a temperature sufficient to sinter and curl the strip and for a time sufficient to form a continuous filamentary article curled about its longitudinal axis, supercooling said article, and finally orienting said article by stretching.

2. The process claimed in claim 1 wherein said polymer latex is one composed of a normally crystalline copolymer prepared from vinylidene chloride and acrylonitrile.

3. The process claimed in claim 1 wherein said strip of coagulum is heated simultaneously from both sides in the radiantly heated zone.

4. The process claimed in claim 1 wherein said filamentary article is supercooled by passing it around a chilled roll immediately after the article leaves the radiantly heated zone.

5. The process claimed in claim 1 wherein said strip of coagulum is less than 1 inch in width.

References Cited in the file of this patent
UNITED STATES PATENTS
2,730,758    Morrell et al. _____ Jan. 17, 1956